3,427,292
MODIFIED SULFUR
Leonard E. A. Godfrey, Princeton, N.J., and John A. Garman, Catonsville, Md., assignors to FMC Corporation, New York, N.Y., a corporation of Delaware
No Drawing. Filed Aug. 31, 1966, Ser. No. 576,237
U.S. Cl. 260—79                                          6 Claims
Int. Cl. C01b 17/02; C09d 1/00

ABSTRACT OF THE DISCLOSURE

Compositions are prepared containing elemental sulfur and a bis(dialkoxyphosphinothioyl) polysulfide or a bis(alkoxythiocarbonyl) polysulfide. The polysulfides act as plasticizers for ordinary sulfur and as stabilizers for polymeric sulfur.

---

This invention relates to sulfur. In a more specific sense the invention pertains to modified sulfur having improved properties.

Elemental sulfur has many known uses and applications. Although the largest single use is in the production of sulfuric acid, considerable quantities are consumed in other principal industries such as wood pulp, carbon disulfide, insecticide, fungicide, rubber, metallurgical, pyrotechnics and petroleum refining.

In certain areas of use, however, it is desirable and even necessary to modify the sulfur or employ it in certain physical forms. Thus, the so-called polymeric or insoluble form of sulfur is preferred to ordinary rhombic sulfur for preventing bloom in rubber stock. Bloom is a term commonly used in the rubber art to describe the crusty or powdery sulfur deposit which forms on rubber products. It is caused by migration of the sulfur through the rubber mass. Polymeric sulfur is obtained by a process involving the rapid quenching of sulfur vapor or liquid and is referred to in greater detail elsewhere herein.

Another important use of sulfur, but one not perfected, is in road marking materials where the sulfur replaces the paint now in current use. This particular application requires a form of sulfur having sufficient elasticity and flexibility to stand up under heavy vehicle traffic. Ordinary sulfur is too brittle to be used directly in road marking material. Because it represents a high volume potential market the use of sulfur in road marking has been investigated extensively.

With a view to extending the utility of elemental sulfur, we have now discovered that its properties can be enhanced and improved to a marked degree by combining it with certain organic polysulfides, and provision of such modified sulfur including a process of preparing it constitutes the principal object and purpose of the invention. Other objects and purposes will be made manifest in the ensuing description.

The aforesaid objects can be realized by mixing elemental sulfur with an organic polysulfide selected from the group consisting of bis(dialkoxyphosphinothioyl) polysulfides and bis(alkoxythiocarbonyl) polysulfide of the following formulae:

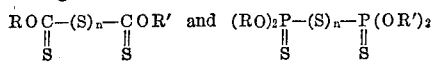

wherein R and R' which may be alike or different represent alkyl radicals of 1 to 18 carbon atoms which in the case of the lower members, i.e., 1 to 4 carbon atoms, can be substituted by phenyl or naphthyl, and $n$ is an integer of from 2 to 4. Illustrative values assignable to R and R' are methyl, phenylmethyl, phenethyl, naphthylmethyl, ethyl, n-propyl, γ-phenylpropyl, isopropyl, isobutyl, n-butyl, n-pentyl, isohexyl, n-heptyl, isooctyl, n-octyl, n-nonyl, n-decyl, un-decyl, dodecyl, tridecyl, tetradecyl, pentadecyl, hexadecyl, heptadecyl, octadecyl, etc.

The organic polysulfides used herein are known chemical entities the description and preparation of which is set forth in the technical and chemical literature. In the case of the bis(dialkoxyphosphinothioyl) polysulfides these are obtained by reacting the requisite alkali metal polysulfide with the appropriate ester of phosphorochloridothioate. Another common procedure consists in oxidizing an alkali salt of O,O-dialkyl phosphorothiolate. Further details on the synthesis of this class of compounds are given in the original literature and chemical texts, and in this connection reference is made to the well known Houben-Weyl in the volumes dealing with organic phosphorus compounds.

The bis(alkoxythiocarbonyl) polysulfides are likewise known materials which are documented extensively in various technical publications and treatises. The disulfides are prepared by reacting carbon disulfide and an alcohol in the presence of an alkali metal hydroxide and oxidizing the resulting xanthate ester salt. Typically one mole of carbon disulfide is added to one mole of the requisite alcohol in one mole of aqueous sodium hydroxide followed by oxidation of the intermediate sodium alkyl xanthate with 1.1 mole of sodium nitrite. In the case of the bis(alkoxythiocarbonyl) trisulfides and tetrasulfides, these can be obtained by reacting the requisite sulfur halide, e.g., sulfur monochloride or sulfur dichloride with an alkali metal xanthate. An especially detailed account of the synthesis of the aforeseaid compounds is given in Zhur. Obshchei Khim., 31, 1631–5 (1961) and in U.S. Patents 2,813,890, 2,876,149 and 2,925,386 to which reference is hereby made.

In carrying out the invention it has been our finding that generally excellent elemental sulfur compositions can be realized where the elemental sulfur is either of the ordinary variety or of the polymeric type. In the case of ordinary sulfur the organic polysulfides appear to function as plasticizers thereby producing a flexible type of modified sulfur. Such a product is suitable as a construction or road marking material because of its high resistance to abrasion and cracking. Consequently the product is capable of bearing up under heavy vehicular traffic. Other uses are as a mortar for construction applications, as a concrete patch material, as a binder for earth and sand, for hardening to provide helicopter landing pads, and other uses of an inexpensive binding material.

In the case of insoluble or polymeric sulfur the organic polysulfides act as stabilizers in that they are effective in suppressing the tendency of the polymeric sulfur to revert to the soluble form. It is generally conceded that polymeric sulfur is formed by the opening of eight member sulfur rings to produce a linear configuration and the reversion of polymeric sulfur to the soluble form is due to the reformation of the eight membered ring. It is our belief that the polysulfides of the invention function as capping agents by tying up the terminal sulfur atoms in the linear chain, thereby preventing its return to the cyclic arrangement. The above explanation is given by way of theory only and is not to be taken or construed as limiting the scope of the invention.

In preparing the compositions of the invention the elemental sulfur and polysulfide are combined using blending techniques known to the art. In the case of ordinary sulfur, mixing with the polysulfide is effected by melting the components together. The resulting molten material is then allowed to solidify to a homogeneous plasticized mass. Another procedure is to blend the components on heated rollers of the type used in the compounding of rubber.

Where the elemental sulfur is of the polymeric or insoluble type, mixing is accomplished by slurrying the insoluble sulfur with a solvent solution of the polysulfide, removing the solvent and recovering the residual mixture of polysulfide and insoluble sulfur.

EXAMPLE 1

Stabilization of insoluble sulfur

A number of 5.0 g. quantities of insoluble sulfur were weighed into crystallizing dishes and the samples mixed with a solution of the polysulfide. The solutions contained 0.025 g. of the polysulfide in 15–25 mls. of carbon disulfide. A like number of samples of insoluble sulfur were weighed out but omitting the polysulfide. These untreated samples serve as controls or blanks. The solvent was allowed to evaporate at room temperature after which the insoluble sulfur and polysulfide mixtures were dried 30 minutes in a vacuum oven at 40° C. at 250 mm. After the insoluble sulfur had been thoroughly mixed with a spatula the material was again assayed. The samples were then divided into equal parts and heated in a constant temperature oven for varying lengths of time. At the end of the heating period samples were again assayed. The results obtained are summarized in the table below.

TABLE 1

| Sample | Initial insoluble content | Tests at 60° C. | | Tests at 80° C. | |
|---|---|---|---|---|---|
| | | 16 hrs. | 40 hrs. | 16 hrs. | 40 hrs. |
| Blank [1] | 97.6 | 82.9 | 77.5 | 55.6 | 39.5 |
| Bis(n-butoxythiocarbonyl) disulfide | 97.6 | 92.1 | 88.1 | 60.4 | 42.7 |
| Bis(diisopropoxyphosphenylthioyl) disulfide | 94.2 | | 87.2 | | 51.1 |
| Blank [1] | 96.0 | 87.7 | 83.4 | 53.5 | 32.4 |
| Bis(ethoxythiocarbonyl) disulfide | 96.7 | 94.4 | 91.4 | 58.1 | 38.7 |

| | | Tests at 40° C. | |
|---|---|---|---|
| | | 7 days | 14 days |
| Blank [1] | 97.6 | 87.4 | 84.9 |
| Bis(diethoxyphosphinothioyl) disulfide | 93.9 | [2] 92.0 | 91.5 |

[1] Blank refers to the unstabilized sulfur of that particular preparation.
[2] Extrapolated figure from insoluble content after 9 days.

The insoluble sulfur used in the above described tests was prepared by the rapid quenching of sulfur vapor with carbon disulfide. The resulting solid was extracted with carbon disulfide to remove soluble sulfur and the insoluble residue dried and assayed. Insoluble sulfur can be obtained on the commercial market.

EXAMPLE 2

Ordinary sulfur was thoroughly mixed with 5.0% of bis(n-butoxythiocarbonyl) disulfide by heating the components to 150° C. Except for a relatively small residue, the additive appeared to be dissolved in the molten sulfur. The liquid was poured into a Pyrex glass mold and allowed to cool. Subsequently the cast rod was removed from the mold and its impact strength measured by the Izod test. For comparison purposes control castings were prepared not containing the additive. The results of the above described test are summarized in the following table.

TABLE 2

| No. | Width (in.) | Thickness (in.) | Reading | Strength, ft./lb. | Lb./in. |
|---|---|---|---|---|---|
| Sulfur (unmodified) | | | | | |
| 1 | 0.485 | 0.485 | 0.140 | 0.1075 | 0.2216 |
| 2 | 0.484 | 0.487 | 0.149 | 0.1065 | 0.2202 |
| 3 | 0.484 | 0.485 | 0.140 | 0.1075 | 0.2221 |
| Sulfur (modified with bis (n-butoxythiocarbonyl) disulfide) | | | | | |
| 1 | 0.488 | 0.487 | 0.182 | 0.1495 | 0.3064 |
| 2 | 0.490 | 0.488 | 0.173 | 0.1405 | 0.2867 |
| 3 | 0.489 | 0.485 | 0.160 | 0.1275 | 0.2607 |

As can be seen, the results show a significant increase in impact strength. Cast samples containing bis(n-butoxythiocarbonyl) disulfide were also found to be less friable than pure elemental sulfur. Such compositions are excellent road marking materials.

The organic polysulfide is used in relatively minor proportions compared with the sulfur substrate. Generally speaking it has been our finding that the compositions herein are preferably formulated containing from about 0.01% to about 5.0% by weight of the organic polysulfide.

As will be apparent to those skilled in the art numerous modifications and variations of the embodiments illustrated herein may be made without departing from the spirit of the invention or the scope of the appended claims.

What is claimed is:
1. A composition of matter consisting essentially of a major amount of elemental sulfur and a minor amount of a compound selected from the class consisting of

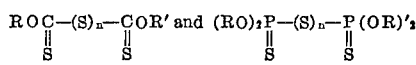

wherein $n$ is an integer from 2 to 4 and R and R' are each selected from the class consisting of alkyl of 1 to 18 carbon atoms and aralkyl of 8 to 12 carbon atoms.
2. The composition according to claim 1 wherein the elemental sulfur is in the polymeric form.
3. The composition according to claim 1 wherein the elemental sulfur is ordinary rhombic sulfur.
4. The composition according to claim 1 wherein the compound is bis(n-butoxythiocarbonyl) disulfide.
5. The composition of claim 1 wherein the compound is bis(diethoxyphosphinothioyl) disulfide.
6. The composition according to claim 1 wherein the compound is bis(diisopropoxyphosphinothioyl) disulfide.

References Cited

UNITED STATES PATENTS 3,219,638  11/1965  Warner _____ 260—79

FOREIGN PATENTS 712,649  6/1965  Canada.

DONALD E. CZAJA, *Primary Examiner.*

M. I. MARQUIS, *Assistant Examiner.*

U.S. Cl. X.R.

260—608, 455, 79.5; 23—224; 106—286